May 15, 1951     J. D. EISLER     2,552,890
ELEVATION INDICATOR
Filed March 9, 1944     4 Sheets-Sheet 1
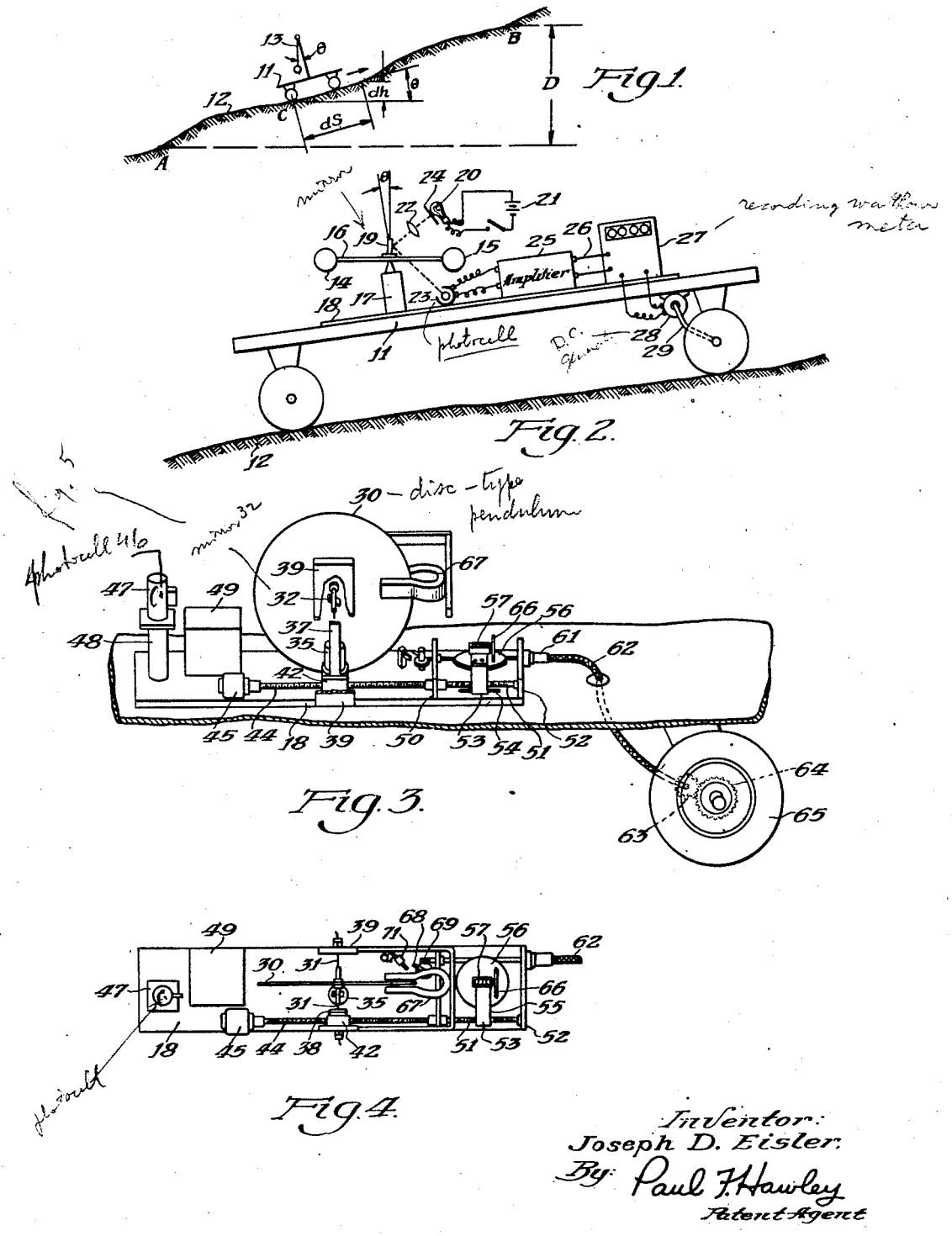
Inventor:
Joseph D. Eisler
By Paul F. Hawley
Patent Agent

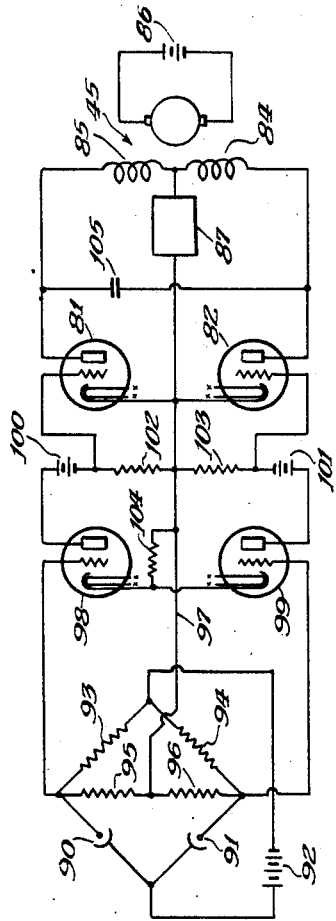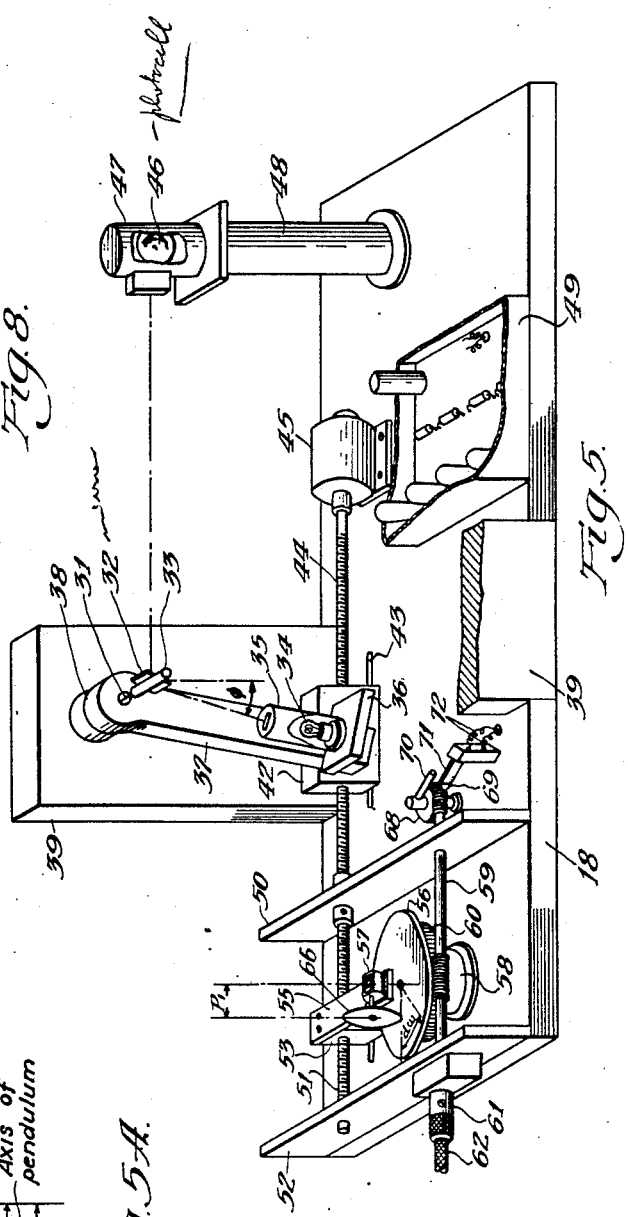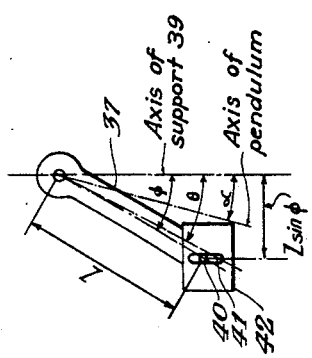

May 15, 1951  J. D. EISLER  2,552,890
ELEVATION INDICATOR

Filed March 9, 1944  4 Sheets-Sheet 3

Inventor:
Joseph D. Eisler,
By Paul F. Hawley
Patent Agent

May 15, 1951     J. D. EISLER     2,552,890
ELEVATION INDICATOR

Filed March 9, 1944     4 Sheets—Sheet 4

Inventor
Joseph D. Eisler
By Paul F. Hawley
Patent Agent

Patented May 15, 1951

2,552,890

UNITED STATES PATENT OFFICE 2,552,890

ELEVATION INDICATOR

Joseph D. Eisler, Philadelphia, Pa., assignor to Stanolind Oil and Gas Company, Tulsa, Okla., a corporation of Delaware Application March 9, 1944, Serial No. 525,638

7 Claims. (Cl. 33—141.5)

This invention pertains to the art of determining differences in elevation between points between which a vehicle travels. It has particular application to the field of gravimetric prospecting, but is not limited to this field, and can be advantageously employed wherever differences in elevation are to be determined to the order of approximatly one foot per mile. As to common subject matter, this is a continuation of my copending patent application Serial No. 463,797, filed October 29, 1942.

The usual method used to determine differences in elevation where high precision is used is by means of the surveying operation known as running a line of levels. This well-known operation will give results accurate to a few hundredths of a foot per thousand feet of distance between survey stations, but is a slow and complicated procedure, requiring a good-sized surveying crew if any sizable region is to be surveyed. In order to overcome these obstacles, where accuracies of the order of ±2 feet per thousand feet between survey stations are sufficient, use has been made of the aneroid barometer. However, this means of determining differences of elevation, even in its most precise forms, cannot be depended upon to yield results of greater accuracy than a ±2 foot difference in elevation per thousand feet of distance between stations, since barometric pressure at any station is not a precise measure of the altitude due to temperature anomalies and other disturbances which cannot be evaluated.

There are many surveying applications where accuracies greater than differences of elevation of ±2 foot per thousand feet must be attained, and which, on the other hand, should be performed with greater speed and a smaller crew than that required in running a line of levels. The invention described herein finds its chief usefulness in such applications. It will be described in connection with its application to one such use, although it is to be realized that it may be used for many other purposes than the one described.

In gravimetric geophysical surveying operations, it is necessary to know the elevation above or below sea level of each station to a mean square error of the order of ±0.2 foot per thousand feet between stations or, in other words, a mean square error of about a half foot per mile. Since at the present time it is possible for a crew using a single gravity meter to occupy from 15 to 30 stations spaced of the order of one to three miles apart, it is apparent that elevations of the requisite accuracy must be run for perhaps 90 miles a day. As a result, gravity meter surveying crews use large leveling crews, and even with this expensive expedient, often find that the geophysical crew must wait on the leveling crew before the data can be reported.

I have discovered means by which differences in elevation of the desired precision can be automatically determined, which can be attached to the vehicle being used to make the gravity meter survey, and which require practically no attendance or particular care during use. By the employment of this apparatus, the entire surveying crew can be eliminated without a sacrifice in accuracy. There is no computing to be done, as the elevation can either appear on a dial or as a deflection on a graph.

It is an object of this invention to provide an automatic direct-reading elevation meter. It is a further object of this invention to provide apparatus for this purpose which may be mounted in any vehicle and which can determine the differences of elevation accurately, even when the vehicle is traveling at high speed.

In brief, this elevation meter includes means for measuring the angle of inclination of the path the vehicle is traveling relative to the horizontal, means for measuring equal increments of length along this path, means for multiplying each of these increments of length by a quantity substantially proportional to the sine of the angle of inclination, and means for algebraically adding these products between the points at which the elevations are to be measured.

The accompanying drawings are illustrations of embodiments of my invention and are included for ease in explaining the operation of the meter. The invention is not limited to the embodiments shown and described. In the various figures, which form a part of this specification and are to be read in conjunction therewith, the same reference numerals in various figures refer to the same or corresponding parts. In the figures:

Figure 1 is a diagram of the geometric quantities involved in the invention.

Figure 2 is a side view in diagrammatic form of a vehicle carrying one form of my invention.

Figure 3 is a perspective view of a second embodiment of my invention with certain parts shown broken away for clearness in illustration.

Figure 4 is a top view of the main elements of the elevation meter shown in Figure 3.

Figures 5 and 6 are other views of the elevation meter of Figure 3 with certain parts broken away.

Figure 5A illustrates the geometry of the relationship of certain movable members involved in the embodiment of the invention shown in Figure 3.

Figures 7, 7A and 8 are wiring diagrams of the electrical equipment shown in Figure 3.

Figure 6:
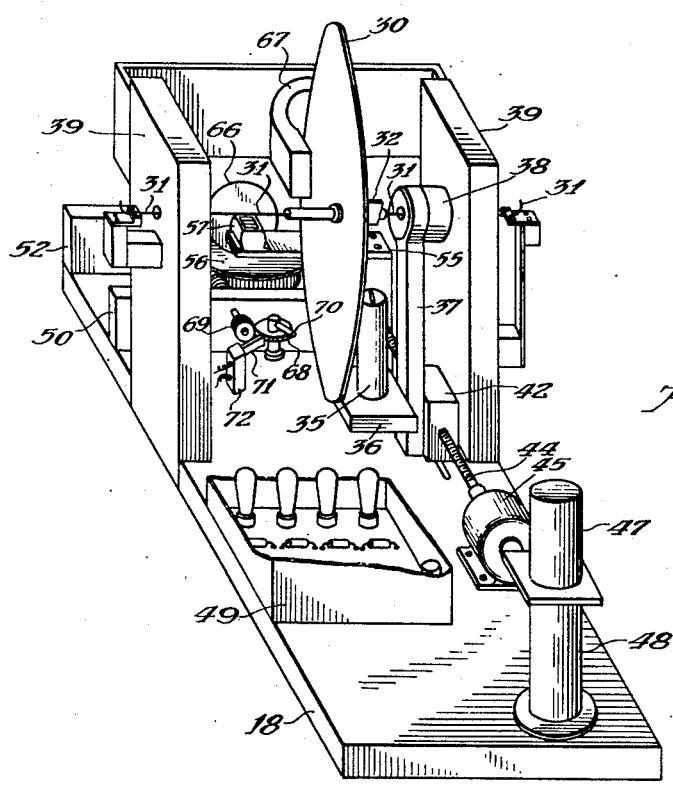

In Figure 1, a vehicle 11 is following a certain path 12 from A to B, the difference in elevation of which is to be determined. This difference in elevation is the distance D shown. The total length of the path from A to B is a certain distance S. If $\theta$ is the angle of inclination of the path to the horizontal at any point C along the path, it is apparent that the incremental difference in elevation $dh$ between point C and a point an incremental distance $dS$ from C is given by $$dh = dS \sin \theta \qquad (1)$$

The total difference in elevation D is given by $$D = \int_A^B \sin \theta dS \qquad (2)$$

In other words, the difference in elevation between the points A and B is the algebraic summation of the product of each increment of distance times the sine of the corresponding angle of inclination. It is to be noted that in this derivation it makes no difference what the horizontal projection of the path S is, i. e., if the vehicle travels from A to B over any path, straight or curved, the total difference in elevation between the two points must be the same. It is also noted that if a pendulum 13 be mounted on the vehicle, the angle of inclination of the pendulum relative to its position when the vehicle is horizontal is also the angle $\theta$.

One form of apparatus for making an algebraic summation of the product of the increments of distance times the sine of the angle of inclination is shown in Figure 2. Here the pendulum comprises two masses 14 and 15 connected by a spacer 16. The pendulum is pivoted on a fulcrum 17 mounted on a base 18 carried by the vehicle. A small mirror 19 is mounted on the spacer 16 above the fulcrum 17. Light from a uniform source, such as a fluorescent type of lamp, illustrated by lamp 20 and energized by a battery 21 is focused by lens 22 and reflected from the mirror 19 towards a photoelectric cell 23. A shield 24 mounted in front of the lamp 20 defines the shape of the beam of light reflected from the mirror 19. The lamp 20 and photoelectric cell 23 are so positioned that the amount of light which reaches the photoelectric cell is directly related to the angle of inclination of the pendulum with respect to the horizontal, i. e. the angle of inclination of the vehicle relative to the horizontal. One method of accomplishing this is to shape the shield 24 so that a long vertical narrow uniform beam of light is produced. The lamp and photoelectric cell then are positioned so that when the path of the vehicle is horizontal, only part of the beam of light, preferably about half, enters the photoelectric cell. An upward inclination of the path then increases the amount of light entering the cell, and vice versa.

The output of the photoelectric cell 23 is amplified by amplifier 25, which produces an output current in leads 26 proportional to the inclination of the path at the point considered. This current is impressed across the current coils of an indicating or recording watthour meter 27. A small direct current generator 28 is coupled by a flexible cable 29 to a wheel of the vehicle. The output voltage of this generator 28 is proportional to the velocity of the vehicle in the direction of the path traveled. This potential is impressed across the voltage coils of the watthour meter 27. As is well known, the output of this meter is given by the expression $$R = \int_{t_1}^{t_2} EI dt \qquad (3)$$

where R is the indicated reading, E is the voltage across the potential coils, I is the current through the current coils, and $dt$ is an increment of time. In this case, the difference in time $(t_2 - t_1)$ is the time between the stations to be surveyed. The potential E is proportional to the velocity of the vehicle along the path hence is given by $$E = K_1 \frac{dS}{dt} \qquad (4)$$

where $K_1$ is a constant of proportionality. The current is proportional to the illumination of the photoelectric cell. With the arrangement shown in Figure 2, this illumination is directly related to twice the angle of inclination $\theta$ as described above and with a circuit arranged to bring it into direct proportionality the Equation for I becomes $$I = K_2(2\theta) = K_3\theta \qquad (5)$$

where $K_2$ and $K_3$ are constants, $K_3$ being twice the magnitude of $K_2$. Substituting the expressions for E and I from Equations 4 and 5 in Equation 3

$$R = K_1 K_3 \int_{t_1}^{t_2} \frac{dS}{dt} \theta dt = K_1 K_3 \int_A^B \theta dS \qquad (6)$$

For angles of inclination up to 5° the sine of the angle is equal to the angle $\theta$ in radians, within an error of only one part in 10,000. An angle of inclination of 5° represents a difference of elevation per mile of 460.2 feet. If the angle itself (in radians) be multiplied by a distance of one mile a value of 460.7 feet is obtained, i. e. an error of ½ foot. It is apparent, therefore, that up to angles of 5°, the value $\sin \theta$ can be substituted for $\theta$ in Equation 6 above. Making this substitution, and combining the constants $K_1 K_3$ into a single constant K one obtains $$R = K \int_A^B \sin \theta dS \qquad (7)$$

which shows that the difference in readings of the watthour meter at points A and B can be made equal to the difference in elevation by choosing the proper values of the constants of proportionality of the current and the voltage. This can easily be determined by experiment or computation.

It is apparent from this discussion that the apparatus satisfies the requirements. It provides means for determining the angle of inclination of the vehicle, means for measuring and continuously multiplying the increments of distance traveled by a quantity substantially directly proportional to the sine of the angle of inclination, and means for algebraically adding the products of this multiplication between the survey stations. It is true that this apparatus satisfies the requirements only up to an angle of inclination of about 5° but it should be pointed out that this covers by far the majority of the surveying situations found in which a vehicle, particularly a self-propelling vehicle, may be moved between stations, since it represents a 8.7% grade. Therefore, the apparatus described can be used with the degree of accuracy required for most practical surveying operations using a vehicle.

Another and preferred embodiment of my invention is illustrated in Figures 3 to 7A. In this embodiment a slightly different type of pendulum is employed. This pendulum is a light metallic disc 30 which is transversely supported on torsional supporting wires 31 the axis of which is normal to the plane of the disc and passes through the disc at a short distance from the center thereof. The pendulum axis is perpendicular to the direction of travel of the vehicle. I have found that the pendulum used in my invention should have a relatively long period in order to be insensitive to a majority of the types of shocks encountered as the vehicle is in motion. These requirements are admirably met in the disc pendulum. The period of such a disc mounted as described is given by the expression $$T' = 2\pi \sqrt{\frac{r^2}{2gd}} \qquad (8)$$

where $r$ is the disc radius, $d$ is the distance from the axis to the center of gravity of the disc, and $g$ is the acceleration of gravity. Obviously with a small value of $d$, the period $T'$ can be made very large as a result of which, small shocks cannot affect its position. Likewise vertical acceleration and rotational acceleration about an axis normal to the axis of support impart proportionately smaller rotational movements to the pendulum. Accordingly, a large amount of the unrest that a normal pendulum would experience is eliminated in the design shown, while the compactness of the device has not been affected.

Another important advantage of this design of pendulum is that the frictional forces normally present at the fulcrum of the pendulum have been substantially entirely eliminated. The supporting wires 31 are in torsion when the pendulum deflects, but there is no sliding contact. In order to have the torsional coefficient as uniform as possible, the wires are made of so-called Isoelastic material. By actual test, I have found that using this type of support, the error due to friction at the support, which is appreciable even when using jeweled bearings and sharp steel pivots, has been reduced to a negligible value.

The pendulum described above has a small but appreciable restoring torque. The pendulum cannot deliver an appreciable amount of power, so that the means used to determine the deflection of the pendulum relative to the base must be separate from the pendulum, i. e. without physical contact. It is impossible to design a pendulum of any reasonable size that can be placed in a vehicle, to drive mechanically a follower mechanism. I employ a freely floating pendulum, i. e., a pendulum which is free of frictional forces and on which no random external force is applied. The follower mechanism employed in this invention to determine the angle of inclination of the pendulum produces no reaction upon the pendulum and can conveniently be a light-sensitive device operating in conjunction with a mirror mounted on the pendulum axis. One such type of unit has already been described in connection with Figure 2. Another type is used in the preferred form of my elevation meter. This can be seen most conveniently in Figure 5, in which the disc has been omitted for clearness in representation. The mirror 32 is mounted on a rod 33 which is attached to the pendulum. An electric lamp 34 is mounted in a shielded housing 35, which in turn rests on a base 36 attached to a pivoted support 37. This support is mounted in bearings at the upper end on a hollow shaft 38 attached to one of the two mounts 39. The bearing and shaft are so aligned that the support 37 rotates axially about the wire 31, as shown in Figure 5A. A pin 40 is mounted to project horizontally from the support 37. A slot 41 vertical to the base 18 is cut in a block 42, of such size that it cooperates with the pin 40, so that as the block 42 is moved longitudinally along the base 18, the support 37 rotates about the pendulum axis. A slot 43 is cut in the base 18, and block 42 is provided with an extension (not shown) fitting in this slot for guiding the travel of this member. A lead screw 44 is threaded into the block 42 and is attached to a reversible motor 45 which by its rotation governs the travel of block 42. From Figure 5A it can be seen that if the support 37 rotates by an angle $\phi$ with respect to a vertical to the base 18, the block 42 has moved a distance along this base equal to a constant $l$ times $\sin \phi$, since the distance from the pivot for support 37 to the pin is $l$. This is the familiar action of the sine bar mechanism with block 42 as the sine bar to which is imparted a motion proportional to the sine of the angle through which the support 37 rotates with respect to the pendulum. Since the number of revolutions of the lead screw 44 governs the travel of block 42, this number is directly proportional to the quantity $\sin \phi$.

The revolutions of the lead screw are governed by the electric motor 45. The input to this motor is in turn controlled by the light entering the photoelectric cell 46 which is mounted in a shield 47 so that no light other than that reflected from the lamp 34 to the mirror 32 can affect its output. The photocell is preferably mounted on a support 48 such that the central part of the photoelectric cell is the same distance from the base 18 as the center of the mirror 32. The leads of this photocell pass to an amplifier and controller device indicated generally by numeral 49. This control unit will be described later in detail. Briefly it consists of two circuits one of which is energized when the light on the photocell 46 increases above a certain minimum value whereas the other one is energized whenever the light from the photocell decreases below a certain value very close to the first-named value. Each of these two circuits includes a field winding in the motor 45 and these two field windings are wound in opposite direction. The armature of the motor is continuously connected to a battery. Obviously, therefore, as soon as the light on the photocell 46 reflected from mirror 32 increases, one field winding is energized and the motor revolves in one direction until the electric lamp 34 has been moved to such a position that the light on the photocell 46 has decreased to the limiting value at which the circuit is rendered operative, whereas if the vehicle inclines in the opposite direction, causing a decrease in the light on the photocell 46, the second circuit is rendered operative and the motor revolves in the opposite direction again swinging lamp 34 around to the point that the illumination on the photocell becomes constant. From this brief discussion it is apparent that any motion of the mirror 32 caused by rotation of the pendulum disc 30 causes a rotation of lead screw 44 which moves block 42 against pin 40, rotating support 37 until the illumination on the photocell is constant.

Other follower mechanisms known in the art may be substituted for that shown, if desired.

Figure 7:
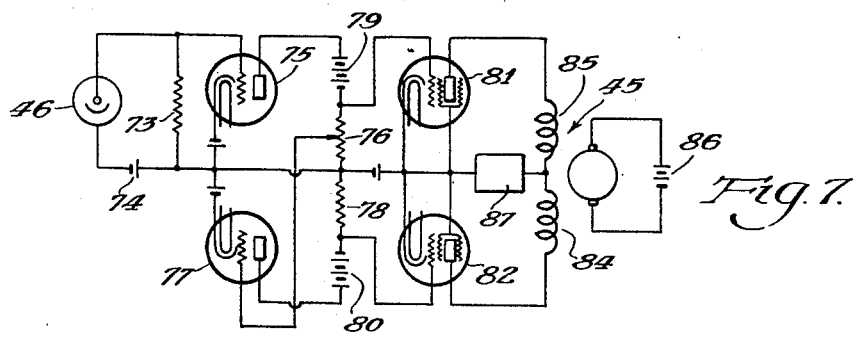

In Figure 7 I have shown a wiring diagram of this apparatus for operating motor 45. The photoelectric cell 46 is connected in series with a resistor 73 and a battery 74. The drop of potential across resistor 73, proportional to the amount of light entering the photocell, is amplified by vacuum tube 75 so that the output appears across the plate resistor 76. The filament heating circuit of the vacuum tube is conventional, hence not shown for the sake of simplicity. A portion of the output voltage across the plate resistor 76 is applied as the grid voltage to a second triode 77, the output of which appears across the plate resistor 78. The two triodes 75 and 77 are supplied with plate batteries 79 and 80. The output voltages across the plate resistors 76 and 78 respectively are applied to the grids of two gas triode tubes 81 and 82. These tubes can, for example, be of the 2051 type. The amplified output of each of the gas triodes 81 and 82 is applied respectively to the independent field winding 84 and 85 of the motor 45. The source of potential for the plates of the triodes 81 and 82 is a pulsating direct current source 87 such as a vibrator type of B eliminator used in automobile radio receivers. The filter customarily used in such a B eliminator is not used in this application so that the voltage output of the source 87 pulsates, dropping to zero periodically. Thus whenever the grid bias on either gas triode is sufficiently negative, the plate current of this tube will cease in the next voltage zero. It is apparent that current will not flow through both of the gas triodes simultaneously. Other types of pulsating plate potential source known in the prior art can be used instead of the type just described, if desired. The armature 85 of this motor is supplied with a separate source of potential, for example battery 86. It is seen from this arrangement that the grids of the two gas triodes are supplied by a direct current amplifier system operating on the output of the photocell 46. Consequently the current in the field windings 83 and 84 depends directly upon the amount of illumination. When this illumination becomes greater than usual, current will flow through one of the field windings, for example winding 84; whereas when the light becomes less than usual current will flow through the other field winding 83. Only when current flows in a field winding is there a sufficient torque to enable the motor 45 to drive the lead screw 44. The motor will, of course, reverse as soon as the current shifts from windings 83 to winding 84 or vice versa. Thus the photocell regulates the motion of the lead screw 44, keeping the electric lamp 34 in such a position that there is a constant illumination entering the photocell 46, as described above.

Figure 7A:
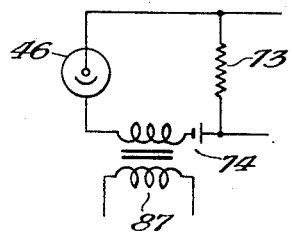

Normally this system works well without any additional apparatus. In some instances, however, I have found that the arrangement of apparatus for the driving of the motor 45 can be improved by inserting in series with the photocell a relatively low value of alternating electromotive force, the magnitude of which is somewhat less than that of the photocell output. This is inserted as shown in Figure 7a in which only a portion of the apparatus shown in Figure 7 is included. An alternating current source is applied across the primary of a transformer 87, the secondary of which is connected in series with the photocell 46 and battery 74 across resistor 73.

The output across resistor 73 is applied between cathode and grid of vacuum tube 75, as shown in Figure 7. The rest of the circuit may be identical to that shown in that figure. This modification reduces any tendency of the system to "hunt," i. e. to cause motor 45 to oscillate about the neutral position.

It is apparent that it makes no difference whether the photoelectric cell 46 and the lamp 34 are mounted as shown in the figures or whether, on the other hand, the lamp 34 is mounted in place of the photocell and the photocell in place of the lamp. In either case there is a relative rotation of the member 37 whenever the illumination of the photocell differs from its average value.

Referring again to Figures 3 to 5, the lead screw 44 passes through a support 50 in which it is rotatably mounted into the end portion of the instrument where each increment of distance is multiplied by the value of sin $\phi$. A lead screw 51 which may be integral with the lead screw 44 and which may have the same pitch, but which preferably has a greater pitch than that of the lead screw 44, is mounted between the support 50 and the support 52. A follower block 53 is threaded through this lead screw 51 and is mounted on a projection (not shown) extending into a slot 54 in the base 18. This slot is in line with the slot in which block 42 moves. If the pitch of the lead screw 51 is identical with that of lead screw 44, follower block 53 and block 42 will move in exact synchronism. If the pitch on lead screw 51 exceeds that on screw 44, the follower block 53 will move precisely at the same time as block 42 but through a distance which is a multiple of the travel of block 42. In either case, its travel is directly proportional to sin $\phi$. On the top of this follower block 53 is mounted an arm 55, one end of which extends over a rotatable disc 56. A revolution counter 57 is mounted on the arm 55 so that the shaft is parallel to the lead screw 51 and so that an imaginary vertical plane passed through the shaft of the counter would pass through the center of the disc 56.

Disc 56 is mounted for rotation about a vertical axis on a bearing 58 in the base 18. The upper surface of this disc is parallel to the surface of base 18. This disc is rotated by a worm 59 which engages a gear 60 coaxially attached to the disc 56. The worm 59 is rotatably mounted in the supports 50 and 52, extending therethrough. It is attached firmly by coupling 61 to the end of a flexible shaft 62 which may be a speedometer cable. The rotation of this cable is in direct relation to the travel of the vehicle as is the customary case in a speedometer cable. One particular type of such drive is shown in Figure 3. This is a small pinion 63 which is attached to the end of the rotatable part of the cable and which is meshed with a gear 64 mounted integrally with the wheel 65 of the vehicle, so that the rotation of the worm 59 is in direct proportion to the revolutions of wheel 65. The wheel may be either a special measuring wheel of light construction which is in addition to the usual wheels, or one of the wheels supporting the vehicle. In either case the diameter of this wheel should be checked at frequent intervals whereby it can be kept at the proper value so that each revolution of the worm 59 will represent a measured increment of distance along the path of travel of the vehicle. The rotating disc 56 under these circumstances moves with an angular displacement proportional to the increments of distance covered by the vehicle. Thus, for example, in Figure 5 a certain angular displacement $d\omega$ will correspond to an increment of distance $dS$ along the road, or $d\omega = K_5 dS$ where $K_5$ is a constant.

Mounted on the shaft of the counter 57 is a sharp edged wheel 66, a point on the periphery of which is constantly in contact with the disc 56. If the distance from the center of the disc 56 to the point of contact between this disc and wheel 66 is $\rho_1$ and the radius of the wheel 66 is $\rho_2$, it is apparent that for a rotation of the disc 56 of $dS$, the angular displacement $d\beta$ of disc 66 will be given by the equation $$d\beta = \frac{\rho_1}{\rho_2} d\omega = K_5 \frac{\rho_1}{\rho_2} dS$$

$$= \frac{K_5}{\rho_2} l \sin \phi \, dS$$

$$= K_6 \sin \phi \, dS \tag{9}$$

where $$K_6 = K_5 \frac{l}{\rho_2}$$

This is merely stating that the peripheral distance traveled by the locus of points of contact of the two discs must be the same. Therefore, the number of revolutions of disc 66 between any two points along the path S will be directly proportional to the integrated product of each increment of distance $dS$ times the corresponding distance $\rho_1$.

$\rho_1$ is equal to the travel of the follower block 53 which, as has been discussed above, is proportional to the sine of the angle of member 37 relative to a line perpendicular to the base 18 of the instrument. This angle designated for convenience as $\phi$ in Figures 5 and 5A is not the angle of inclination $\theta$ of the path along which the vehicle is traveling but rather, absent any restoring torque in the supporting wires 31, is twice this quantity. The number of revolutions ($n$) of wheel 66 and accordingly the difference in elevation between two points A and B as indicated by the revolution counter 57 is given, in accordance with Equation 9 and the discussion just above by $$N = K_6 \int_A^B \sin \phi \, dS \tag{10}$$

It is apparent to anyone skilled in the art that by proper choice of the size of the various elements $K_5$, $l$, and $\rho_2$, the constant $K_6$ may be made equal to one-half and hence the total number of revolutions N of wheel 66 is in this case given by $$N = \int_A^B \frac{\sin 2\theta}{2} dS \tag{10a}$$

For values of $\theta$ which are relatively small, Equation 10a can be replaced by the following equation:

$$N = \int_A^B \sin \theta \, dS \tag{11}$$

It is apparent that this last quantity is exactly equal to the difference in elevation between points A and B. It is easy to compute that for differences in elevation up to the order of 300 feet per mile, the apparatus described immediately above reads accurately the difference in elevation, with a maximum error of only 0.5 foot per mile of traverse. Therefore the difference in reading of the counter at the points A and B can be made equal to the difference in elevation of these points for slopes up to and including 300 feet per mile so that the operator of the vehicle can, by setting the initial reading of the counter 57 to the elevation of point A, read the elevation of any other point B with respect thereto. It is to be noted in this connection, when the vehicle moves downhill to the left, that block 42 and follower block 53 will both move to the left (in Figures 3 to 5), placing the point of contact between disc 56 and wheel 66 to the left of the center of disc 56 so that the revolution counter 57 revolves in reverse direction, thus subtracting off the difference in elevation automatically as the vehicle moves downhill. The reading N is therefore the algebraic summation of the revolutions of wheel 66.

The above embodiment has been found to meet the usual requirements for accuracy in topographic leveling especially where no steep slopes are encountered. On steeper slopes it has been found in practice that the difference between $\sin \theta$ and $\frac{1}{2} \sin 2\theta$ will not permit accuracy as low as 0.5 mean square foot per mile. As shown hereinafter, greater accuracy can be obtained at steeper slopes in a number of ways. One embodiment involves the proper selection of the torsion coefficient for supporting wires 31.

When due to a slope there is an appreciable torsional restraint imposed on the disc pendulum 30 by the supporting wires 31 the pendulum will tend to rotate with supports 39. Consequently angle $\alpha$, the angle between the axis of the pendulum and the perpendicular axis of the instrument (see Figure 5A), will be less than angle $\theta$ or $$\alpha = Z\theta \tag{12}$$

where Z is the ratio of the restrained angle of deflection to the unrestrained angle of deflection due to the torsional restraint of the supporting wires 31. It may be shown from a summation of the moments of force about supporting wires 31 that $$Wd \sin (\theta - \alpha) = T\alpha \tag{13}$$

where W is the weight of the pendulum, $d$ its length and T the ratio of restoring torque to angular deflection.

In practice I have found that supporting wires 31 can be selected such that for one particular values of $\theta$, called $\theta'$, the corresponding angular deflection of the pendulum can be made $\frac{1}{2}\theta'$, that is $Z = \frac{1}{2}$. By substitution in Equation 13 it follows that $$\sin (\theta' - .5\theta') = \frac{T}{Wd} \alpha'$$

It will be apparent from Equation 13 that the relation $\alpha = .5\theta$ can be satisfied only at one value of plus or minus $\theta$. However, in practice I have found that by setting $\alpha = 1.5°$ when $\theta = 3°$, on average slopes the error involved at other values of $\theta$ up to $\pm 10°$, becomes insignificant. Substituting $\alpha = 1.5°$ and $\theta = 3°$ in Equation 13, and converting $\alpha$ to radians, $$0.0261799 = \frac{Wd}{T} \sin 1.5° = \frac{Wd}{T} 0.0261777$$

$$\therefore \frac{Wd}{T} = 1.000084$$

Thus the instrument constant $$\frac{Wd}{T}$$

can conveniently be made unity, or approximately unity by proper selection of the suspension wires 3I, the weight of the pendulum W and the length of the pendulum d. Under these conditions $$\angle\left(\alpha=\frac{\theta}{2} \text{ when } \theta=3°\right)$$

Equation 13 becomes $$\alpha=1.000084 \sin(\theta-\alpha)$$

and since $\phi=2\alpha$, or $\alpha=\phi/2$ (see Figure 5A):

$$\frac{\phi}{2}=1.000084 \sin\left(\theta-\frac{\phi}{2}\right) \quad (14)$$

The following table, which is based on Equation 14, demonstrates the theoretical error per mile for slopes of 0 to ±10°.

| θ degrees | Error, Ft./Mi. |
|---|---|
| 1 | .005 |
| 2 | .000 |
| 3 | .005 |
| 4 | .026 |
| 5 | .050 |
| 6 | .100 |
| 7 | .169 |
| 8 | .269 |
| 9 | .391 |
| 10 | .544 |

Even these small errors tend to be canceled out in practice due to the fact that in any traverse the plus and minus slopes are approximately equal. Therefore $\phi$ is approximately equal to $\theta$, and Equation 11 becomes equally applicable to the situation where a restoring force is applied to the pendulum by suspending it on selected flexible supporting wires 3I.

Under these conditions the counter correctly records the difference in elevation between points A and B upon all slopes commonly encountered in practice. After the instrument has been designed with proper supporting wires 3I so that the revolution counter will correctly indicate the elevation in feet, it is merely necessary to drive the vehicle over a surveyed path and notice the reading of the counter. Hence the difference in elevation between any point B and the traverse starting point may be read directly from the counter.

I have found that instead of using the value Z=½, that Z can have other values between 0 and 1. In this case it can be demonstrated mathematically that the reading of the instrument is equal to the difference in elevation when the pitch on screw 51 is less than the pitch on screw 44 but related to it by the relationship $$\frac{1}{2Z}$$

that is, the pitch on screw 51 is $$\frac{1}{2Z}$$

times the pitch on screw 44. In such a case the quantity transmitted to the block 53 is directly proportional to the quantity $$\frac{\sin 2Z\theta}{2Z}$$

The accuracy of this arrangement is greatest when Z has the value ½ but for values of Z greater or less than this quantity up to Z having a maximum value of 1, the instrument will read properly up to the usual angles of inclination found in surveying in the Mid-Continent region.

The pendulum disc 30 experiences shocks as the vehicle travels over a rough road. In spite of the design of the disc pendulum, some of these shocks cause the discs to oscillate about its axis, thereby causing the block 42 to oscillate. In order to reduce this oscillation, the motion of the disc is damped electromagnetically by employing a magnet and the disc itself as an eddy-current brake. The magnet, which may be a horseshoe magnet 67, is mounted so that the magnetic flux is impressed transversely through the disc near its circumference. In accordance with well-known principles, rotation of the disc produces a drag due to eddy-currents induced in the disc, which drag is proportional to the disc rotational velocity. By this means oscillation of the pendulum discs 30 due to shock is reduced.

Another type of photocell following apparatus is shown in Figure 8. This has the advantage over the type shown in either Figure 7 or 7A that fluctuations in voltage applied to the light source cannot shift the "zero position" of the follower mechanism. It is apparent that, using the system of Figure 7, any diminution in the light intensity falling on the photocell 46 will cause the follower block 42 to move in the same direction that it would if the pendulum were tilted to decrease the amount of light on this photocell. In the circuit shown in Figure 8 the absolute intensity of the light falling on the photocell arrangement is of no particular importance. It is merely the variation in the light caused by the motion of the pendulum that is effective. In this figure two photocells 90 and 91 which can conveniently be made up of a "double photocell" combination, that is, two adjacent photocells mounted in the same glass envelope are connected back-to-back by a source of potential 92 through two resistors 93 and 94 respectively. These resistors 93 and 94 are preferably quite high, for example of the order of 10 megohms or more, although somewhat lower resistors can be used. To more resistors 95 and 96 connected in series are also placed across the photocell combination. The center point of these resistors is connected to the common negative line 97 of the entire system. This line may or may not be grounded but there is less possibility of trouble from pick-up, etc. if a ground is used. The other ends of the resistors 95 and 96 are connected respectively to the grids of two triode vacuum tubes 98 and 99, supplied with approximately equal plate batteries 100 and 101 and approximately equal plate resistors 102 and 103. Resistor 104 is connected between the negative line 97 and the cathodes of the two vacuum tubes 98 and 99. It is apparent that the resistor 104 is a degenerative feed back resistor common to both tubes 98 and 99. Its function is to make the system much more sensitive to the change in light intensity on the photocells. The output voltage across resistors 102 and 103 is applied to the grids of gas triodes 81 and 82, the output of which is applied across the double field windings 84 and 85 of motor 45 in exactly the same manner as that described in connection with Figure 7. The same pulsating type of source of plate E. M. F. 87 for the tubes 81 and 82 is used in Figure 8 as is used in Figure 7. A condenser 105, the capacity of which is relatively small, for example 0.001 microfarad, is connected from plate to plate of the two gas triodes. This is a familiar expedient used for shutting off one of two gas triodes when the other triode fires.

Since the two photoelectric cells 90 and 91 are mounted side by side, their outputs will be equal when the light from the light source 34 is evenly distributed between them. However, as soon as the mirror 32 rotates so that one photoelectric cell receives more illumination than the other there will be a difference in the grid voltages applied to the tubes 81 and 82, with a corresponding energization of one of the motor fields 84 and 85 in such a direction that motor 45 moves the light source until the illumination again becomes equalized. The position of equilibrium is determined in this circuit not by the intensity of the illumination but by the motion of the light source relative to the two photoelectric cells, so that the relative output from the pair of photocells is the quantity controlling the movement of the light source.

Sometimes it is necessary to take readings at short intervals of distance, for example where a profile is being prepared of the line traversed by the vehicle a convenient method of doing this is shown by the drawings. A gear 68 is rotatably mounted on base 18 to rotate on a vertical axis. It is rotated by worm 69 mounted on an extension of the shaft of worm 59 above this gear. Rotated with it is an arm 70 which as it revolves periodically forces together the contact points of switch 71 which is likewise mounted on base 18. The leads 72 from this switch are connected in series with a buzzer and battery (not shown) which give an audible signal whenever contact is made. The ratio of gear 68 and worm 69 is so chosen that these signals occur at any given interval of distance, e. g. every 100 feet. Upon hearing the signal, the operator records the reading of the counter, which enables very rapid profiling to be accomplished.

Figure 9:
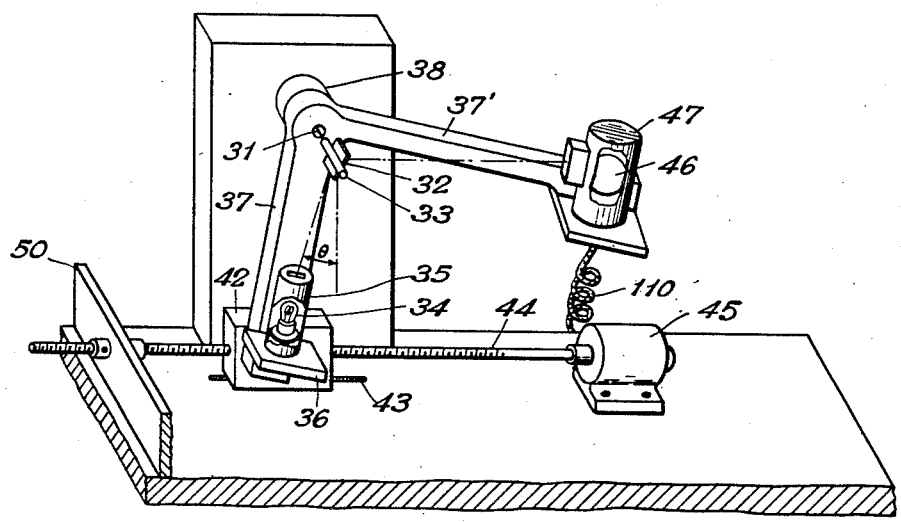
Figure 9 is a perspective view of a modification of the basic design of the elevation meter with certain parts shown broken away for clearness in illustration.

Another particularly advantageous arrangement of the lamp and photocell in such a fashion that the movement of the lamp is directly in accordance with the angle of inclination of the path is shown in Figure 9. In this figure both the photoelectric cell 46 in its housing 47 and the lamp 34 with surrounding shield 35 are mounted on the same member 37'. Preferably but not necessarily this mounting is at right angles to the line between the photoelectric cell and the mirror 32. The photoelectric cell is connected to the amplifier which may advantageously be of the types shown in Figure 7 or 8 by means of a shielded flexible lead 110. With this arrangement of equipment, the torsion fibers 31 are chosen to have the lowest possible torsional coefficient so that the rotation of the disc 30 and the associated mirror 32 will be directly in accordance with the angle of inclination of the path of the vehicle. As soon as the mirror moves through an angle $\theta$ it is apparent from the arrangement of equipment that the photoelectric cell 46 and also the light source 34 will each move correspondingly and that therefore the motion of the member 37' will be directly given by the angle of inclination of the path. The follower block 42, therefore, is moved in accordance with the sine of the angle of inclination of the path travelled. In this case the reading of the counter 57 attached to disc 66 is therefore directly proportional to the difference in elevation between any two points in the path.

It is to be noted that in the embodiment of the invention shown in Figure 9, just as in the previous embodiments, there is no physical restraint applied to the motion of the disc 30 and that photoelectric means are used to produce a motion which varies with the sine of the angle of inclination.

All embodiments of this invention involve the same basic principle; namely, that there is a measurement of increments of length along the path being surveyed; there is a production of a quantity directly proportional to this measurement; there is a production of a second quantity substantially proportional to the sine of the angle of inclination of the path; and means for summing up the product of the two quantities algebraically and continuously between the points on the path at which the difference in elevation is to be measured. Obviously the accuracy of the survey is directly dependent upon the accuracy of production of the quantity substantially proportional to the sine of the angle of inclination. It has already been shown that to the desired accuracy, the means for measuring the angle of inclination may produce an initial response which may be anything from considerably less than this angle to double the angle, if the maximum angle of inclination is within certain limits. This initial response in turn automatically controls the production of a quantity proportional to the sine of this response. Finally this last-named quantity is continuously multiplied by a constant factor which produces an output quantity substantially proportional to the sine of the angle of inclination. This gives an approximation if the initial response is to any quantity differing from the actual angle of inclination, and as the response varies from this actual angle, the maximum slope which can be surveyed accurately decreases. Thus if the response is proportional to twice the angle of inclination, the required accuracy is maintained for inclinations up to a maximum of 3° 20'. If the response is proportional to 1.2 times the angle of inclination the maximum angle at which accurate surveys can be made increases to 6°, and so on. In all cases within the maximum allowable angle, the final quantity produced, that is, the quantity by which the increments of distance are multiplied, is substantially proportional to the sine of the angle of inclination.

Various modifications of the system shown and described and other modifications of the basic instrument not so shown will be apparent to those skilled in the art. The invention is not limited to the embodiments which are shown in these drawings but is set out in the appended claims.

I claim:

1. An elevation meter for use on a vehicle which meter comprises a disc pendulum, torsion elements affixed at one end to said pendulum for mounting said pendulum on a substantially horizontal axis transverse to the vehicle's direction of motion said torsion elements being affixed at the other end to supports that rotate with said vehicle whereby the pendulum moves with respect to the vehicle through an angle $\alpha$, the angle $\alpha$ being a function of the angle $\theta$ and being dependent upon the torsion constant of said torsion elements where $\theta$ is the instantaneous angle of inclination of the vehicle, a mirror fixedly mounted with respect to said pendulum, means for directing a beam of light against said mirror, light-sensitive means for receiving reflected light from the mirror and for converting said reflected light to electrical energy; means for rotating at least one of said two last-named means through an angle proportional to the angle $\alpha$ when said pendulum moves through an angle $\alpha$ with respect to said vehicle, a sine bar mechanism for converting said rotation into a linear motion substantially proportional to sin θ and means for integrating a quantity proportional to said linear motion multiplied by *ds* through the distance traveled by said vehicle.

2. An elevation meter for use on a vehicle which meter comprises a disc pendulum, torsion elements affixed at one end to said pendulum for mounting said pendulum on a substantially horizontal axis transverse to the vehicle's direction of motion said torsion elements being affixed at the other end to supports that rotate with said vehicle whereby the pendulum may move with respect to the vehicle through an angle α, the angle α being a function of the angle θ and being dependent upon the torsion constant of said torsion elements where θ is the instantaneous angle of inclination of the vehicle, a mirror fixedly mounted with respect to said pendulum, means for directing a beam of light against said mirror, light-sensitive means for receiving reflected light from the mirror and for converting said reflected light to electrical energy, means for rotating said two last-named means through an angle substantially equal to the angle α when said pendulum moves through an angle α with respect to said vehicle, a sine bar mechanism for converting said rotation into a linear motion substantially proportional to sin θ, a disc constructed and arranged to rotate in accordance with distance traveled by said vehicle, a wheel bearing against and rotatable by said disc, said wheel being associated with and being moved by said sine bar mechanism substantially axially along a line passing through the axis of said disc whereby the total rotation of said wheel between any two points in the path of said vehicle is substantially proportional to the difference in elevation of said two points.

3. In an elevation meter for use on a vehicle characterized by a pendulum mounted to rotate with respect to the vehicle through an angle substantially proportional to the inclination of said vehicle, a sine bar mechanism associated with and actuated by the rotation of said pendulum, in integrator constructed and arranged to multiply a quantity proportional to an increment of distance traveled by said vehicle times a quantity substantially proportional to the sine of the angle of rotation of said pendulum relative to said vehicle, and to sum up the results of said multiplication, the improvement which comprises a high-inertia, light-weight, long-period, disc-type pendulum which is substantially insensitive to a majority of the types of shocks encountered as said vehicle is in motion, torsion elements affixed at one end to said pendulum for mounting said pendulum on a substantially horizontal axis which is transverse to the vehicle's direction of motion, said torsion elements being affixed at the outer ends to supports that rotate with said vehicle, a mirror arranged to be deflected proportional to deflection of said pendulum relative to said vehicle, a light-sensitive device, and apparatus associated with said sine bar mechanism for directing a beam of light against said mirror in such direction that it will always be reflected to said light-sensitive device, whereby said pendulum floats freely and assumes an angle with respect to said vehicle which is substantially proportional to the angle of inclination of said vehicle.

4. An apparatus for indicating variations of elevation of the path traversed by a vehicle comprising means for producing a motion proportional to distance traveled by said vehicle, a disc pendulum resiliently supported by torsion elements which are affixed at the outer ends to supports that rotate with said vehicle, said torsion elements supporting said pendulum on a substantially horizontal axis transverse to the vehicle's direction of motion whereby the pendulum may move with respect to the vehicle through the angle α, the angle α being a function of the angle θ and being dependent upon the torsion constant of said torsion elements where θ is the instantaneous angle of inclination of said vehicle with respect to said path for each increment of distance *ds* traveled, a non-reactive follower for said pendulum, said follower being adapted to rotate an element through an angle of about 2α when said pendulum moves through an angle α with respect to said vehicle, means for converting said rotation to a linear motion proportional to sin 2α, and means for integrating a quantity proportional to said linear motion multiplied by *ds* through the distance traveled by said vehicle.

5. An apparatus for indicating variations of elevation of the path traversed by a vehicle comprising means for producing a motion proportional to distance traveled by said vehicle, a disc pendulum resiliently supported by torsion elements which are affixed at the outer ends to supports that rotate with said vehicle, said torsion elements supporting said pendulum on a substantially horizontal axis transverse to the vehicle's direction of motion whereby the pendulum may move with respect to the vehicle through the angle α, the angle α being a function of the angle θ and being dependent upon the torsion constant of said torsion elements, where θ is the instantaneous angle of inclination of said vehicle with respect to said path for each increment of distance *ds* traveled, a follower for said pendulum including a mirror connected to and rotating with said pendulum, means for directing a beam of light against said mirror, light-sensitive means for receiving reflected light from said mirror and for converting said reflected light to electrical energy, driving means for rotating one of said two last-named means through an angle of about 2α when said pendulum moves through an angle α with respect to said vehicle, a sine bar for converting the output of said driving means into a linear motion proportional to sin 2α, and means for integrating a quantity proportional to said linear motion multiplied by *ds* through the distance traveled by said vehicle.

6. An apparatus according to claim 5 in which said means for integrating consists of a disc rotated in accordance with distance traveled by said vehicle, a wheel bearing against and rotatable by said disc, said wheel being driven toward and away from the axis of rotation of said disc by the output of said driving means whereby the rotation of said wheel is substantially proportional to variations in the elevation of points along the path of said vehicle.

7. In an elevation meter for use on a vehicle, a high-inertia, light-weight, long-period, disc-type pendulum resiliently mounted between torsion fibers for rotation on a substantially horizontal axis which is transverse to the vehicle's direction of motion, said torsion fibers being affixed at the outer ends to supports that rotate with said vehicle, whereby the pendulum may rotate with respect to the vehicle through an angle substantially proportional to the inclination of said vehicle, a sine bar mechanism associated with and actuated through a non-reactive follower by the rotation of said pendulum, and an integrator constructed and arranged to multiply a quantity proportional to an increment of distance traveled by said vehicle times a quantity substantially proportional to the sine of the angle of rotation of said pendulum relative to said vehicle, and to sum up the results of said multiplication, whereby said pendulum floats freely and assumes an angle with respect to said vehicle which is substantially proportional to the angle of inclination of said vehicle.

JOSEPH D. EISLER.

REFERENCES CITED

The following references are of record in the file of this patent:

UNITED STATES PATENTS

| Number | Name | Date |
| --- | --- | --- |
| 982,336 | Wimperis | Jan. 24, 1911 |
| 1,100,698 | Stoddard | June 16, 1914 |
| 1,109,667 | Dikeman | Sept. 8, 1914 |
| 2,046,005 | Sprecker | June 30, 1936 |
| 2,113,436 | Williams | Apr. 5, 1938 |
| 2,252,727 | Pepper | Aug. 19, 1941 |
| 2,362,616 | Cloud | Nov. 14, 1944 |

FOREIGN PATENTS

| Number | Country | Date |
| --- | --- | --- |
| 530,764 | Germany | Aug. 1, 1931 |